(12) United States Patent
Zhdanov

(10) Patent No.: US 8,624,969 B2
(45) Date of Patent: Jan. 7, 2014

(54) METHODS OF ELECTROMAGNETIC MIGRATION IMAGING OF GEOLOGIC FORMATION

(75) Inventor: Michael S. Zhdanov, Holladay, UT (US)

(73) Assignee: TechnoImaging, LLC., Salt Lake City, UT (US)

( * ) Notice: Subject to any disclaimer, the term of this patent is extended or adjusted under 35 U.S.C. 154(b) by 355 days.

(21) Appl. No.: 13/183,680

(22) Filed: Jul. 15, 2011

(65) Prior Publication Data

US 2012/0026314 A1 Feb. 2, 2012

Related U.S. Application Data

(60) Provisional application No. 61/369,985, filed on Aug. 2, 2010.

(51) Int. Cl.
H04N 7/18 (2006.01)

(52) U.S. Cl.
USPC .......................................................... 348/85

(58) Field of Classification Search
None
See application file for complete search history.

(56) References Cited

U.S. PATENT DOCUMENTS

| | | | |
|---|---|---|---|
| 2,794,949 A | 6/1957 | Hedstrom et al. | |
| 3,214,616 A | 10/1965 | Way et al. | |
| 3,521,153 A | 7/1970 | Moss | |
| 3,887,923 A | 6/1975 | Hendrix | |
| 4,814,711 A | 3/1989 | Olsen et al. | |
| 5,053,783 A | 10/1991 | Papadopoulos | |
| 5,175,500 A | 12/1992 | McNeill | |
| 5,610,523 A | 3/1997 | Elliot | |
| 5,770,945 A | 6/1998 | Constable | |
| 6,253,100 B1 | 6/2001 | Zhdanov | |
| 6,603,313 B1 | 8/2003 | Srnka | |
| 6,628,119 B1 | 9/2003 | Eidesmo et al. | |
| 6,677,756 B2 | 1/2004 | Fanini et al. | |
| 6,879,735 B1 | 4/2005 | Portniaguine et al. | |

(Continued)

FOREIGN PATENT DOCUMENTS

| | | |
|---|---|---|
| GB | 1294484 | 10/1972 |
| WO | WO 2008/070200 | 6/2008 |

(Continued)

OTHER PUBLICATIONS

U.S. Appl. No. 60/868,905, filed Dec. 6, 2006, Velikhov et al.

(Continued)

*Primary Examiner* — Dave Czekaj
*Assistant Examiner* — Nam Pham
(74) *Attorney, Agent, or Firm* — Workman Nydegger

(57) ABSTRACT

Methods and systems for imaging-while-drilling and look-ahead imaging of a geological formation using a borehole devices measuring multi-component vector and/or tensor logging data. An electromagnetic field transmitter generates an electromagnetic field. Electromagnetic receivers measure the response from the geological formation around the borehole and ahead of the device at various receiving positions. A central processing unit may compute a migration field by simulating the replacement of the receivers with conceptual transmitters, calculate an integrated sensitivity of the recorded electromagnetic field data, compute a reference field, and calculate a cross power spectra of the reference and the migration fields or cross correlation functions between the reference and the migration fields. A spatial weighting of the cross power spectra or cross correlation functions produces a numerical reconstruction of directional images and look-ahead images of the conductivity distribution around the borehole and/or ahead of the device located within the borehole.

20 Claims, 12 Drawing Sheets

(56) References Cited

U.S. PATENT DOCUMENTS

| | | | |
|---|---|---|---|
| 6,900,640 B2 | 5/2005 | Fanini et al. | |
| 7,126,338 B2 | 10/2006 | MacGregor et al. | |
| 7,550,969 B2 | 6/2009 | Zhdanov | |
| 7,969,152 B2 | 6/2011 | Velikhov et al. | |
| 2007/0097788 A1* | 5/2007 | Tang et al. | 367/52 |
| 2008/0136420 A1 | 6/2008 | Velikhov et al. | |
| 2010/0194394 A1 | 8/2010 | Zhdanov et al. | |
| 2011/0144472 A1 | 6/2011 | Zhdanov | |
| 2012/0026314 A1* | 2/2012 | Zhdanov | 348/85 |

FOREIGN PATENT DOCUMENTS

| | | |
|---|---|---|
| WO | WO 2008/092205 | 8/2008 |
| WO | WO 2010/088525 | 8/2010 |
| WO | WO 2012/018505 | 2/2012 |

OTHER PUBLICATIONS

U.S. Appl. No. 61/148,946, filed Jan. 31, 2009, Velikhov et al.
U.S. Appl. No. 61/285,909, filed Dec. 11, 2009, Zhdanov.
U.S. Appl. No. 61/369,985, filed Aug. 2, 2010, Zhdanov.
U.S. Appl. No. 61/506,538, filed Jul. 11, 2011, Zhdanov et al.
U.S. Appl. No. 61/508,504, filed Jul. 15, 2011, Zhdanov et al.
U.S. Appl. No. 61/535,590, filed Sep. 16, 2011, Zhdanov.
U.S. Appl. No. 61/541,722, filed Sep. 30, 2011, Zhdanov.
Constable, S.C. 1990, Marine electromagnetic induction studies: Surveys in Geophysics, 11, pp. 303-326.
Guerin, R., Tabbagh, A., and Andrieux, P., 1994, Field and/or resistivity mapping in MT-VLF and implications for data processing: Geophysics, 59, 1695-1712.
Michael S. Zhdanov et al.: "Fast 3D Imaging from a Single Borehole Using Tensor Induction Logging Data", Society of Petrophysicists and Well-Log Analysts, vol. 45, No. 2, Apr. 2004, pp. 167-177, XP002663172.
Alexander Gribenko and Michael Zhdanov: "Regularized integral-equation based inversion of tensor induction logging data in three-dimensional formations", Society of Exploration Geophysicists, ISSN: 1052-3812, DOI: doi: 10.1190/1.2792470.
Krieghauser et al—Improved shale sand interpretation in highly deviated and horizontal wells using multi-component induction log data: 42st Annual LoggingSymposium, SPWLA, Transactions, paper S and An efficient and accurate pseudo 2-D inversion scheme for multi component induction log data: 71st Annual25 International Meeting, SEG, Expanded Abstracts, 37638.
U.S. Appl. No. 11/676,936, Apr. 1, 2010, Office Action.
U.S. Appl. No. 11/676,936, Feb. 23, 2011, Office Action.
U.S. Appl. No. 11/676,936, Mar. 23, 2011, Notice of Allowance.

* cited by examiner

METHODS OF ELECTROMAGNETIC MIGRATION IMAGING OF GEOLOGIC FORMATION

CROSS-REFERENCE TO RELATED APPLICATIONS

This application claims the benefit of U.S. Provisional Application No. 61/369,985, filed Aug. 2, 2010, which is incorporated herein by reference in its entirety.

BACKGROUND

1. The Field of the Invention

The embodiments disclosed herein relate to electromagnetic imaging of geological formation. In general, the embodiments disclosed herein relate to formation evaluation, imaging-while-drilling and look-ahead imaging using borehole devices measuring multi-component vector and/or tensor electromagnetic logging data.

2. The Relevant Technology

A multi-component induction logging tool was originally introduced for resolving anisotropic geological formations (e.g. as described by Fanini, et al. in U.S. Pat. No. 6,677,756 and U.S. Pat. No. 6,900,640; and by Kriegshauser et al. (Improved shale sand interpretation in highly deviated and horizontal wells using multi-component induction log data: 42st Annual Logging Symposium, SPWLA, Transactions, paper S and An efficient and accurate pseudo 2-D inversion scheme for multi component induction log data: 71st Annual International Meeting, SEG, Expanded Abstracts, 376380). This instrument has three mutually perpendicular magnetic induction receiver coils and three magnetic induction transmitter coils.

The foundations of tensor induction well logging (TIWL) in anisotropic geological formations were outlined in papers by Zhdanov et al. (Foundations of tensor induction well-logging: Petrophysics, 42, 588-610 and Principles of tensor induction well logging in a deviated well in an anisotropic medium: Transactions, 42-nd SPWLA Annual Logging Symposium, Houston, paper R).

It was demonstrated by Zhdanov in U.S. Pat. No. 6,253,100 that the methods of optical and radio holography can be extended to a broad band electromagnetic (EM) field for imaging objects in nontransparent media by a system of electric and/or magnetic transmitters and receivers placed at different positions around the object.

BRIEF SUMMARY

The embodiments disclosed herein provide a method of formation evaluation, imaging-while-drilling and look-ahead imaging of a geological formation using borehole devices measuring multi-component vector and/or tensor electromagnetic data. An induction and/or galvanic electromagnetic field transmitters located in the borehole may generate a frequency domain or a time domain electromagnetic field. Multi-component electric or/or magnetic field receivers may measure the response from the geological formation around the borehole and/or ahead of the device at various receiving positions in the borehole. A central processing unit may collect the recorded electromagnetic field data and compute a migration field by simulating the replacement of the receivers with an array of induction and/or galvanic transmitters, respectively.

The central processing unit may then calculate an integrated sensitivity of the recorded electromagnetic field data to conductivity perturbations at a specific local area of the examined geological formation around and/or ahead of the device. The central processing unit may also compute a reference field as an electromagnetic field generated by the induction and/or galvanic transmitters in the background medium consisting of the examined geological formation without the presence of an anomalous target and calculates a cross power spectra of the reference and migration fields or cross correlation functions between the reference and migration fields in the area around the borehole and/or ahead of the device. A spatial weighting of the cross power spectra or cross correlation functions produces a numerical reconstruction of directional images and look-ahead images of the conductivity distribution around the borehole and/or ahead of the device located within the borehole.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Figure 1A:
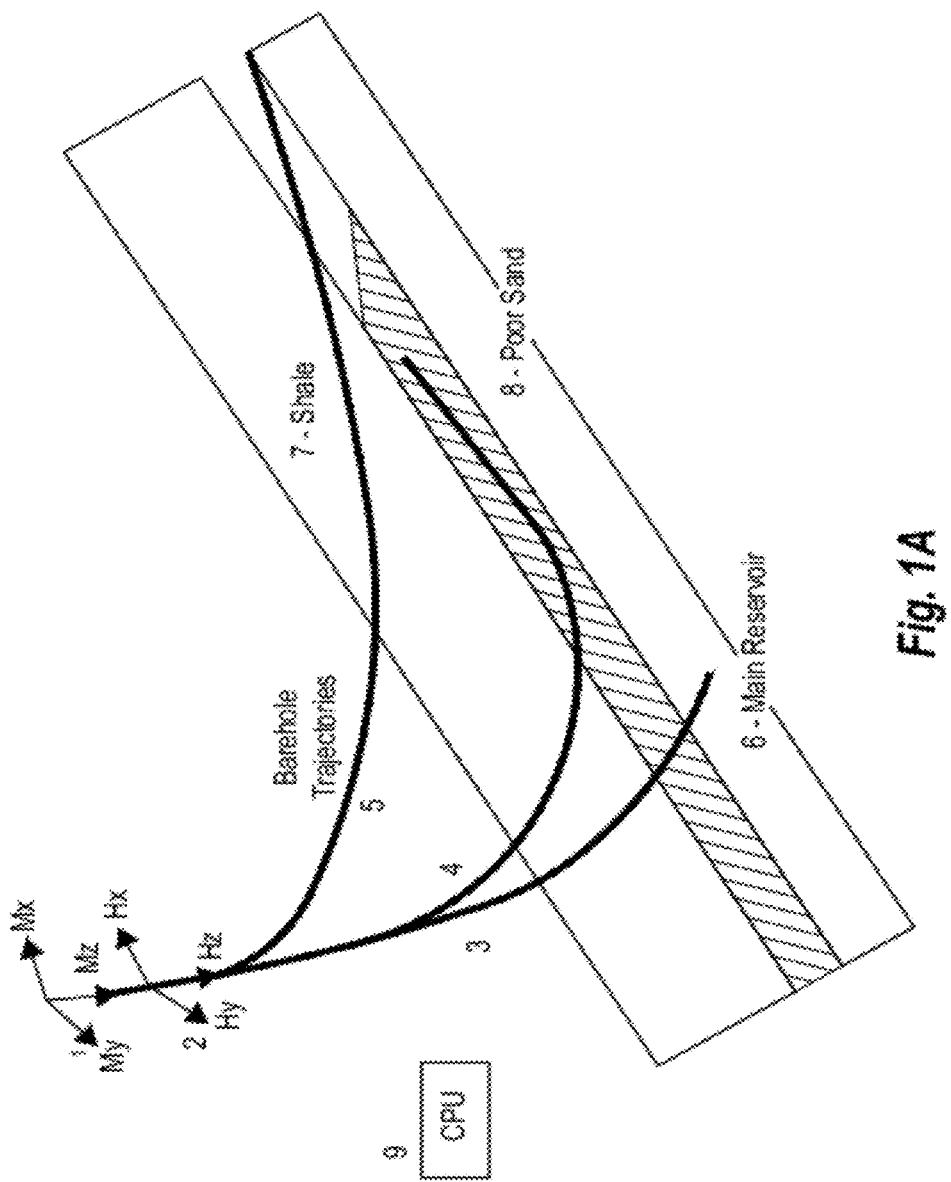
FIG. 1A illustrates logging-while-drilling (LWD) and/or measurement-while-drilling (MWD), and/or imaging-while-drilling of electromagnetic data for real-time or post-measurement formation evaluation, improved well placement and geosteering according to embodiments disclosed herein.

The embodiments disclosed herein relate in general to formation evaluation and imaging-while-drilling using borehole devices measuring multi-component vector and/or tensor electromagnetic data. The embodiments disclosed herein can be applied for directional images to identify fracture zones and hydrocarbon reservoir locations, to provide look ahead images for early warning of approaching formation boundaries, and for adjusting borehole position and orientation (inclination and azimuth angles) during drilling operation to reach one or more specific geological formations. Of course, it will be appreciated that the embodiments disclosed herein may be applied to other applications as well such as tunnel and underground facility detection.

In operation, a multi-component vector and/or tensor electromagnetic well-logging instrument may be put in a borehole either by wireline or by mounting direct to a mandrill. The instrument may provide electromagnetic transmitters and receivers suitable for transmitting and receiving electric and/or magnetic fields in different directions parallel and orthogonal to the axis of the borehole. The transmitters may generate a frequency domain or time domain electromagnetic field which propagates through a geological formation, including fracture zones, hydrocarbon reservoirs, water reservoirs, or approaching formation boundaries, and is recorded by the receivers. The receivers may be either for electric fields and/or for magnetic fields.

The measured electromagnetic field components in the receiver locations may be used as conceptual sources (transmitters) of electromagnetic field data, as each source has an electric and/or magnetic moment that replicate the actually measured electric and/or magnetic field component. These conceptual sources (transmitters) may produce a migration electromagnetic field $\{E^m, H^m\}$. A reference field or background field $\{E^b, H^b\}$, representative of a background medium consisting of an examined geologic formation without the presence of anomalous targets, may be calculated using Maxwell's equations.

An integrated sensitivity of the multi-component vector and/or tensor electromagnetic logging instrument may be obtained by estimating a least square norm of values of perturbations of at least one component of the measured electromagnetic field data due to a conductivity perturbation at a specific local area of the examined geologic formation. A migration image of the resistivity distribution around and/or ahead of the well-logging instrument may then be reconstructed by spatially weighting a cross power spectra of the reference and the migration fields or cross correlation functions between the reference and the migration fields in the area around the borehole and/or ahead of the device.

The embodiments disclosed herein are well suited for logging-while-drilling (LWD) and/or measurement-while-drilling (MWD) and/or imaging-while-drilling, and/or look-ahead applications which require a imaging of geological formations from a borehole around and ahead of the borehole. The embodiments disclosed herein may also be applied for wireline or mandrill-mounted applications. The desired images, such as the three-dimensional resistivity distribution of the target are readily derived from the multi-component vector and/or tensor electromagnetic logging data. The measured electric and/or magnetic field components in the receiver locations are used as the electric and/or magnetic moments of the conceptual electric and/or magnetic transmitters to generate numerically the migration field. A spatial weighting of the cross spectrum or correlation function between the migration and reference fields by an integrated sensitivity produces a numerical reconstruction of a volume image of resistivity distribution.

Attention is now given to FIG. 1, which illustrates an embodiment of imaging-while-drilling and look-ahead imaging of geological formation using borehole devices. The imaging system of FIG. 1 may be comprised of three mutually orthogonal transmitter coils 1 and one or more similar sets of receiver coils 2 located at some distance from the transmitting set of coils 1. The array of transmitters and receivers may either consist of one transmitter set and one receiver set (as shown) or of multiple transmitter sets and multiple receiver sets. The imaging system is located in the borehole, which may be drilled along the different trajectories 3, 4, or 5 as shown.

In FIG. 1, the borehole trajectories 3, 4, and 5 are approaching a target and may enter the main reservoir 6 from the overlying shale layer 7 and go along the reservoir layer as shown by trajectory 4, or instead of staying in the main reservoir, they may continue into the poor sand 8 as shown by trajectory 3, or even never cross the main reservoir as shown by trajectory 5. Accordingly, the embodiments disclosed herein introduce an imaging method which allows the operator to navigate the borehole into the main reservoir.

The transmitters 1 may generate a harmonic (frequency domain) or a pulse (time domain) primary electromagnetic field which may propagate through the medium containing the geologic deposit. The receivers 2 may receive an electromagnetic field that has been scattered by the geological formation. The central processing unit 9 of FIG. 1 may then collect the recorded amplitudes and/or phases of the electromagnetic field that has been scattered by the geological formation and may operate the migration imaging system, as is shown in FIG. 2. The desired properties of the geologic formation, such as conductivity or resistivity distribution, may then be derived from this image. The central processing unit 9 may be located in the borehole electromagnetic device and the images transmitted to the operator, or may be located with the operator to where electromagnetic data are transmitted from the borehole electromagnetic device.

Figure 1B:
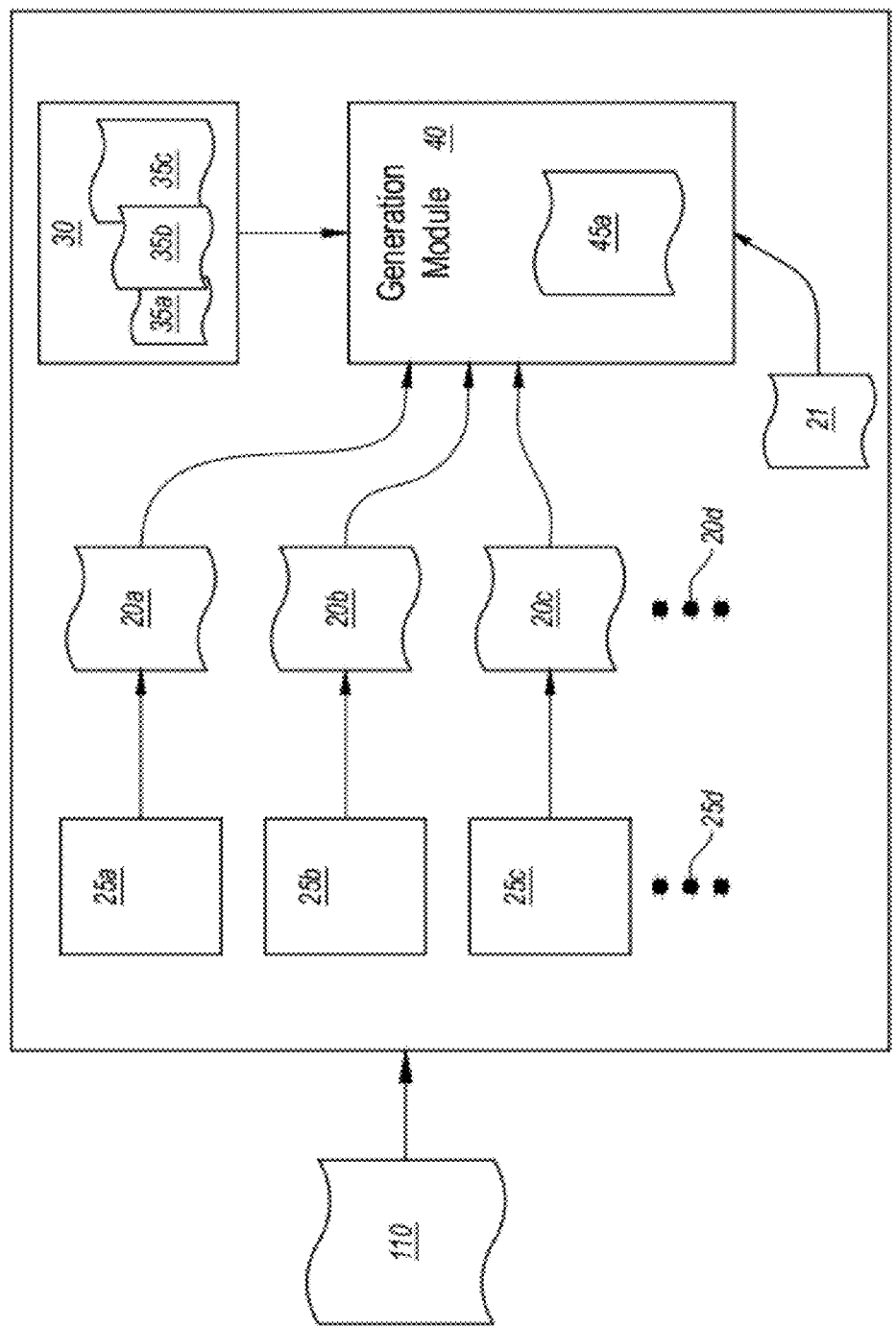
FIG. 1B illustrates an embodiment of processor or computing system for producing a migration image according to present disclosure.
Figure 2:
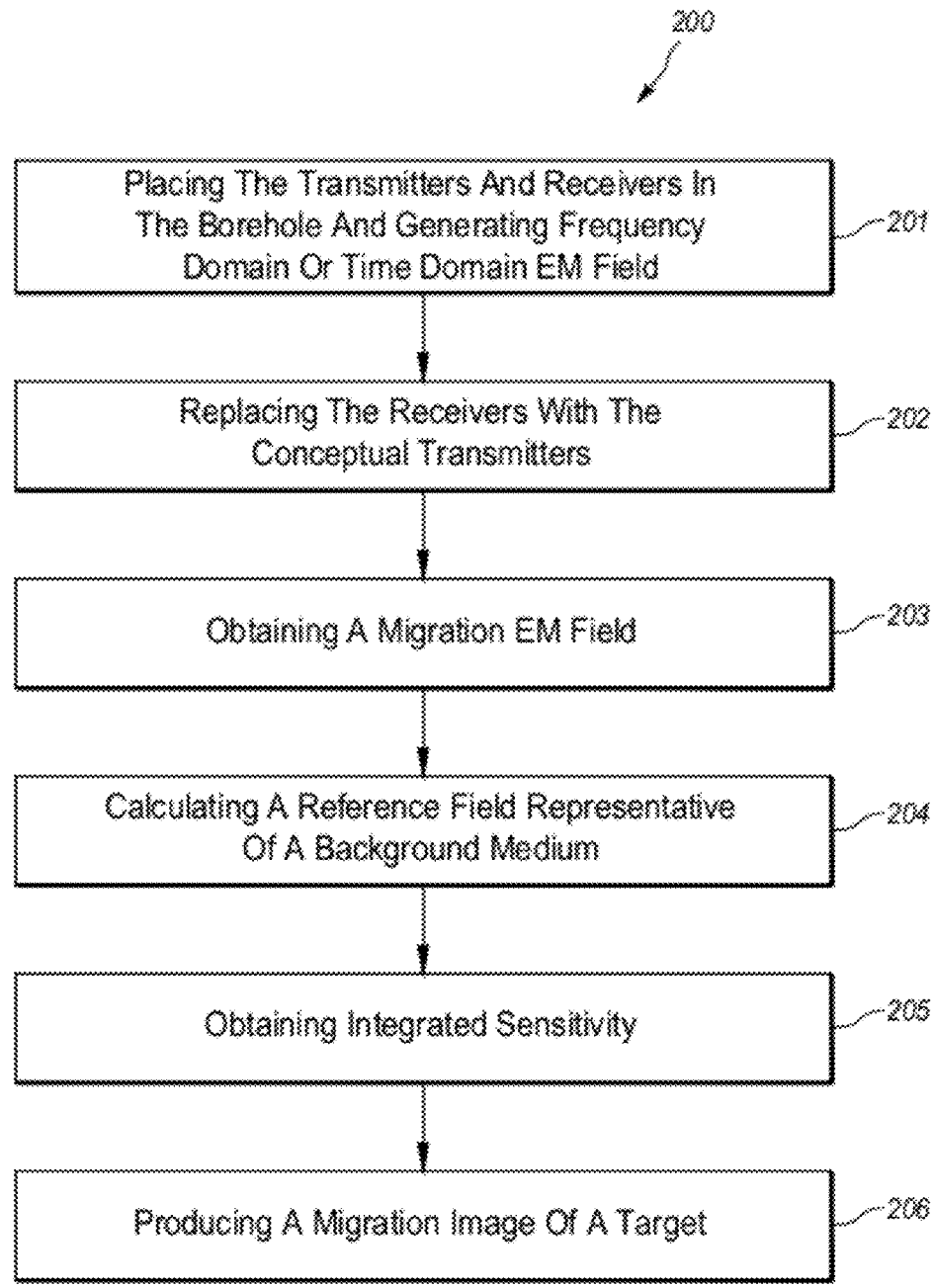
FIG. 2 illustrates an embodiment of a method for imaging-while-drilling and look-ahead imaging of a geological formation using a borehole electromagnetic logging device.

FIG. 1B illustrates an example embodiment of the processor 9, which in this embodiment may be a computing system that is able to perform various operations for producing a migration image in accordance with the principles of the embodiments disclosed herein. As shown, processor 9 receives measured electromagnetic data 110 from at least one of the receivers 2.

The processor 9 may then conceptually replace the at least one receiver 2 with an array of one or more conceptual sources 25a, 25b, and 25c (also referred to herein as conceptual sources 25) of an electric or magnetic component located in the positions of the receiver 3. The ellipses 25d represent that there may be any number of additional conceptual sources 25 depending on the number of receivers 2. The conceptual sources 25 replicate the actually measured electric or magnetic field of the receivers 2.

The processor 9 may then obtain and/or compute migration electromagnetic fields 20a, 20b, 20c (also referred to herein as migration electromagnetic fields 20) and potentially any number of additional back-propagating (migration) fields as illustrated by the ellipses 20d. The migration electromagnetic fields may be equivalent migration electromagnetic fields produced by the conceptual sources 25. The processor 9 may also obtain and/or compute reference field 21 representative of a background medium consisting of an examined geologic formation without the presence of an anomalous target.

In other words, the measured electric and/or magnetic field components in the receiver locations (amplitudes and phases in the frequency domain or amplitude in time domain) are used as the electric and/or magnetic moments of one or more conceptual transmitters that may replace the actual receivers in order to numerically generate the migration electromagnetic field. The central processing unit 9 calculates the reference electromagnetic field 21 representative of a background medium consisting of the examined geologic formation without the presence of the anomalous target.

As illustrated in FIG. 1B, the processor 9 includes a sensitivity module 30. The sensitivity module 30 may obtain and/or compute an integrated sensitivity 35a, 35b, 35c of the sensors 1 and/or 2. In one embodiment, the sensitivity module 30 estimates a least square norm of values of perturbations of the measured electromagnetic tensor data at the locations of the receivers 2.

A generation module 40 of the processor 9 may then generate and/or produce a migration image 45a by calculating a cross power spectra of the reference fields 21 and the migration electromagnetic fields 20 and spatially weighting cross power spectra with the integrated sensitivity 35. The processor 9 may then determine the location, shape, and electrical conductivity of an anomalous target within the geologic formation around the borehole and/or ahead of the device in a wellbore.

In other words, the central processing unit 9 may also calculate an integrated sensitivity of the imaging system (e.g., the multi-component vector and/or tensor electromagnetic logging instrument) to conductivity perturbations at different local areas of the examined geologic formation. A vector cross power spectrum of the reference and migration EM fields or a cross correlation function between the reference and migration EM fields weighted with the integrated sensitivity may produce a numerical reconstruction of a volume image of conductivity or resistivity distribution around the borehole and ahead of the device in the borehole. An imaging apparatus applied according to the embodiments disclosed herein has relatively simple software for imaging-while-drilling and is also able to perform in real time as well as post-measurement.

EXAMPLE 1

The following explanation of the principles of the electromagnetic migration imaging-while-drilling and look-ahead imaging is offered to assist those skilled in the art to practice the embodiments disclosed herein. It is not intended thereby to limit the scope of the embodiments disclosed herein to any particular theory of operation or to any field of application.

Figure 3:
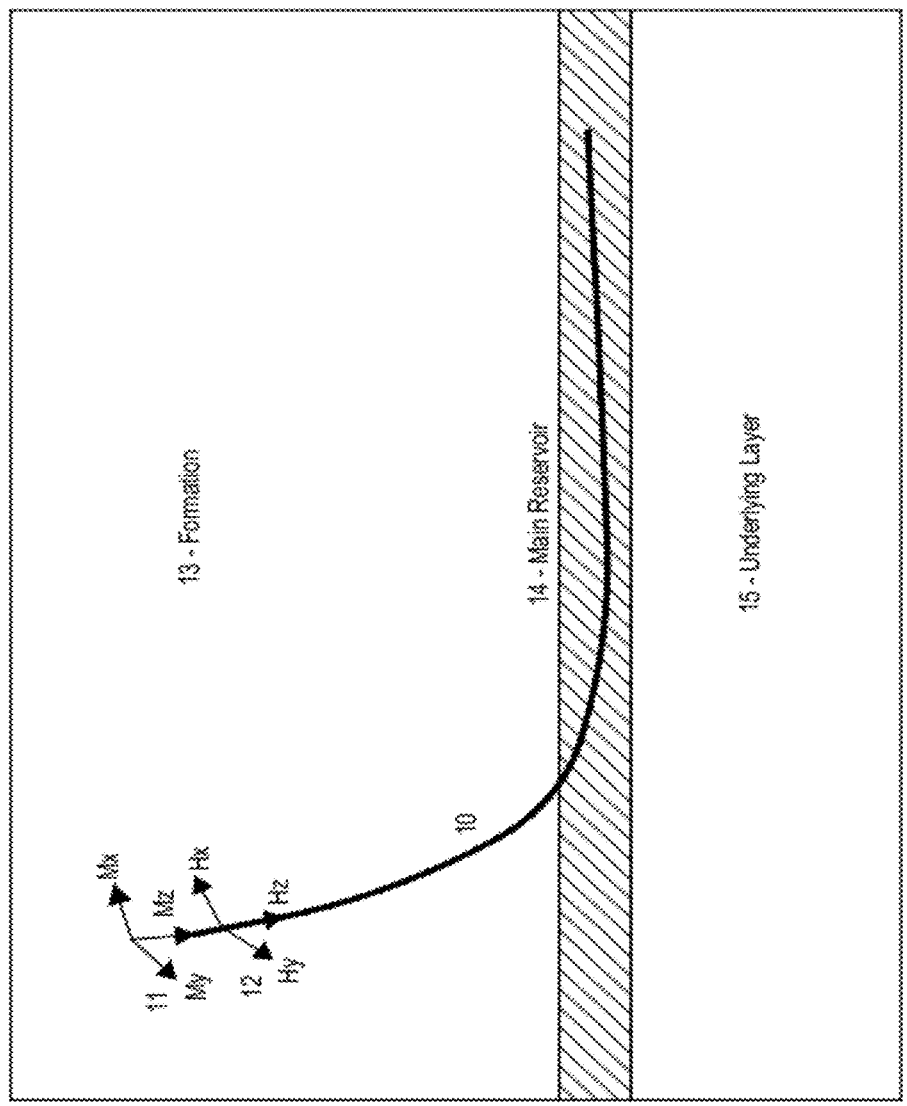
FIG. 3 illustrates a model of a rock formation penetrated by a borehole with a borehole electromagnetic device used for imaging-while-drilling and look-ahead imaging of geological formation according to embodiments disclosed herein.

Consider a geoelectrical model of a rock formation penetrated by a borehole 10, as shown in FIG. 3. A simplified imaging system is shown in FIG. 3 including three mutually orthogonal transmitter coils 11 (also referred to as simply transmitters 11) and one or more similar sets of receiver coils 12 (also referred to as simply receivers 12) located at some distance from the transmitting set of coils. The borehole penetrates a section of the formation that has a known background conductivity $\sigma_b$. The location and volume D of a geologic deposit 14 (e.g., the main reservoir) with arbitrarily varying conductivity $\sigma = \sigma_b + \sigma_a$ (where $\sigma_a$ is anomalous conductivity) are unknown. The goal is to produce a look-ahead image of the geological formation from the electromagnetic data collected in the borehole 10 above the target.

The total EM field registered by the receivers 12 in this model can be rep-resented as a sum of the reference (background) field $\{E^b, H^b\}$, generated by the system of transmitters 11 in the model with the background conductivity distribution, and an anomalous field $\{E^a, H^a\}$, due to an inhomogeneity $\sigma_a$:

$$E = E^b + E^a, H = H^b + H^a \qquad (1)$$

To generate the image of the geological formation 14 (e.g., the main reservoir) within the formation with the known background conductivity $\sigma_b$, the receiver system 12 is replaced by a set of conceptual transmitters with transmitter moments, $M_x$, My, and $M_z$ equal to the recorded anomalous fields in the receivers 12 in the reverse time:

$$M(r',\tau) = H^a(r',T-\tau) = H(r',T-\tau) - H^b(r',T-\tau) \qquad (2)$$

where T is the time duration of the field observations, and $$M(r',\tau) = (M_x(r',\tau),(M_y(r',\tau),(M_z(r',\tau)) \qquad (3)$$

A typical imaging process of the disclosed embodiments comprises:

1. Generating the migration electromagnetic field, $E^m(r,\tau)$, $H^m(r,\tau)$, produced by the conceptual transmitters located in the positions of the receivers with the moments determined by formulae (2). The migration field everywhere outside the receivers satisfies Maxwell's equations in the reverse time $\tau$ within the formation 13 of FIG. 3 with a background conductivity $\sigma_b$:

$$\nabla \times H^m = \sigma_b E^m, \nabla \times E^m = -\mu_0 \partial H^m / \partial \tau \qquad (4)$$

where $\mu_0$ is the free-space magnetic permeability.

2. Obtaining a reference (background) field representing the electromagnetic field generated by the actual transmitters in the formation 13 of FIG. 3 with the background conductivity $\sigma_b$ in the absence of the geological formation 14 (e.g., the main reservoir). The reference (background) field everywhere outside the transmitters satisfies the following system of Maxwell's equations in real time t:

$$\nabla \times H^b = \sigma_0 E^b, \nabla \times E^b = -\mu_0 \partial H^b / \partial t \qquad (5)$$

3. Obtaining an integrated sensitivity of the data acquisition system by estimating a least square norm of the values of perturbation of the magnetic field, $\delta H$, due to conductivity perturbations at a specific local area of the examined formation according to the following formula:

$$S(r) = (\|\delta H\|_T) / \delta \sigma \qquad (6)$$

$$\|\delta H\|_T = \sqrt{\int_T \delta H(t') \cdot \delta H(t') dt'} \qquad (7)$$

4. Producing a volume image of the conductivity distribution, $\sigma_m(r)$, by spatially weighting of the cross correlation function between the reference and the migration electromagnetic fields by the integrated sensitivity S (r) according to the following formula:

$$\sigma_m(r) = \sigma_b - k \frac{1}{S(r)} \int_T E^b(r, t) \cdot E^m(r, T-t) \, dt. \qquad (8)$$

As shown in FIG. 1, the electromagnetic field is recorded by receivers 2 that have been placed in the borehole at some distance from transmitters 1. The CPU system 9 analyzes the recorded field and fulfills the following numerical processes:

(1) It numerically simulates a system of conceptual transmitters located in the positions of the receivers with the moments, determined by formula (2).

(2) It computes the migration fields, $\{E^m, H^m\}$, generated by the conceptual transmitters located in the positions of the receivers.

(3) It computes the integrated sensitivity of the data acquisition system to the conductivity variations.

(4) It constructs the volume images of conductivity and/or resistivity distribution by calculating a spatial distribution of cross correlation function between the reference and the migration fields weighted with the integrated sensitivity.

EXAMPLE 2

As a practical example of LWD electromagnetic migration imaging, the same geoelectrical model of the rock formation penetrated by a borehole 10, as shown in FIG. 3 is considered. It is assumed that the background resistivity of the formation 13 penetrated by a borehole is 1 Ohm-m, the resistivity of the main reservoir 14 is 100 Ohm-m, and the resistivity of the underlying layer 15 is 1 Ohm-m. The main reservoir 14 has a thickness of 10 m. The induction logging device comprising the three mutually orthogonal transmitter coils 11 and three mutually orthogonal receiver coils 12 detects the time domain responses of the formation.

Figure 4A:
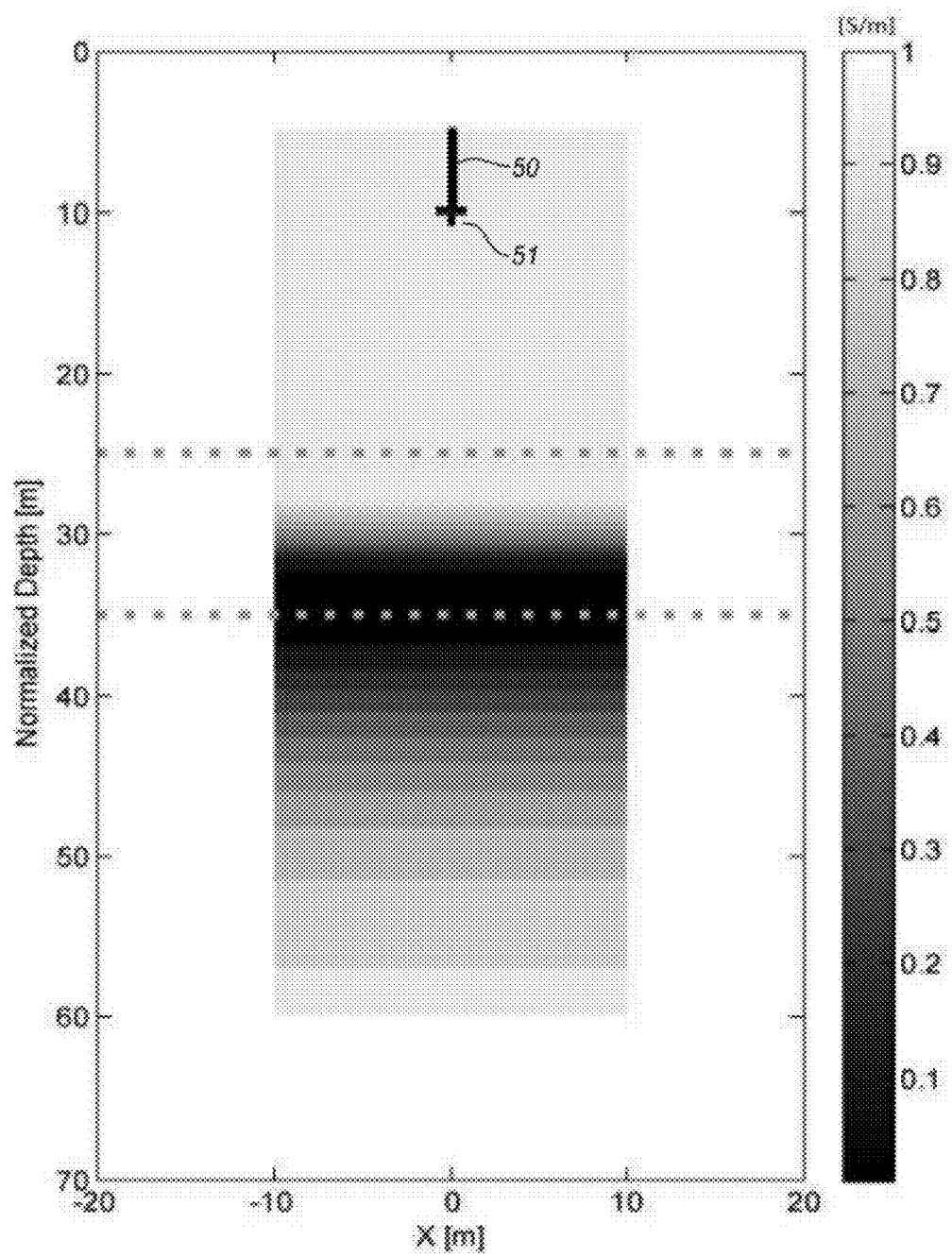
FIG. 4 illustrates a typical look-ahead migration image of a reservoir obtained from time-domain electromagnetic data recorded by a tensor induction well-logging device (shown by a cross) located in a vertical well at different distances from the reservoir (panels a, b, and c).
Figure 4B:
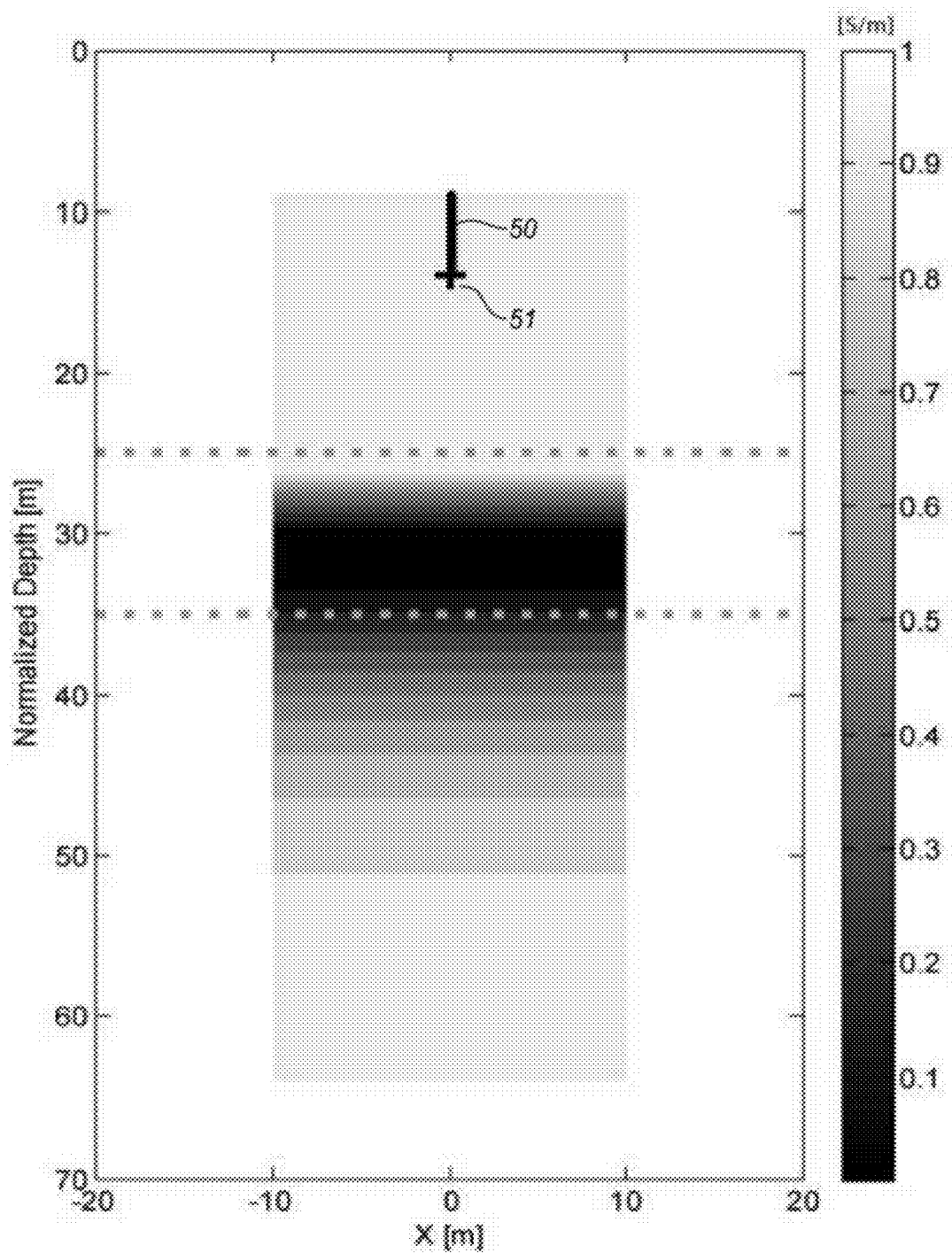
Figure 4C:
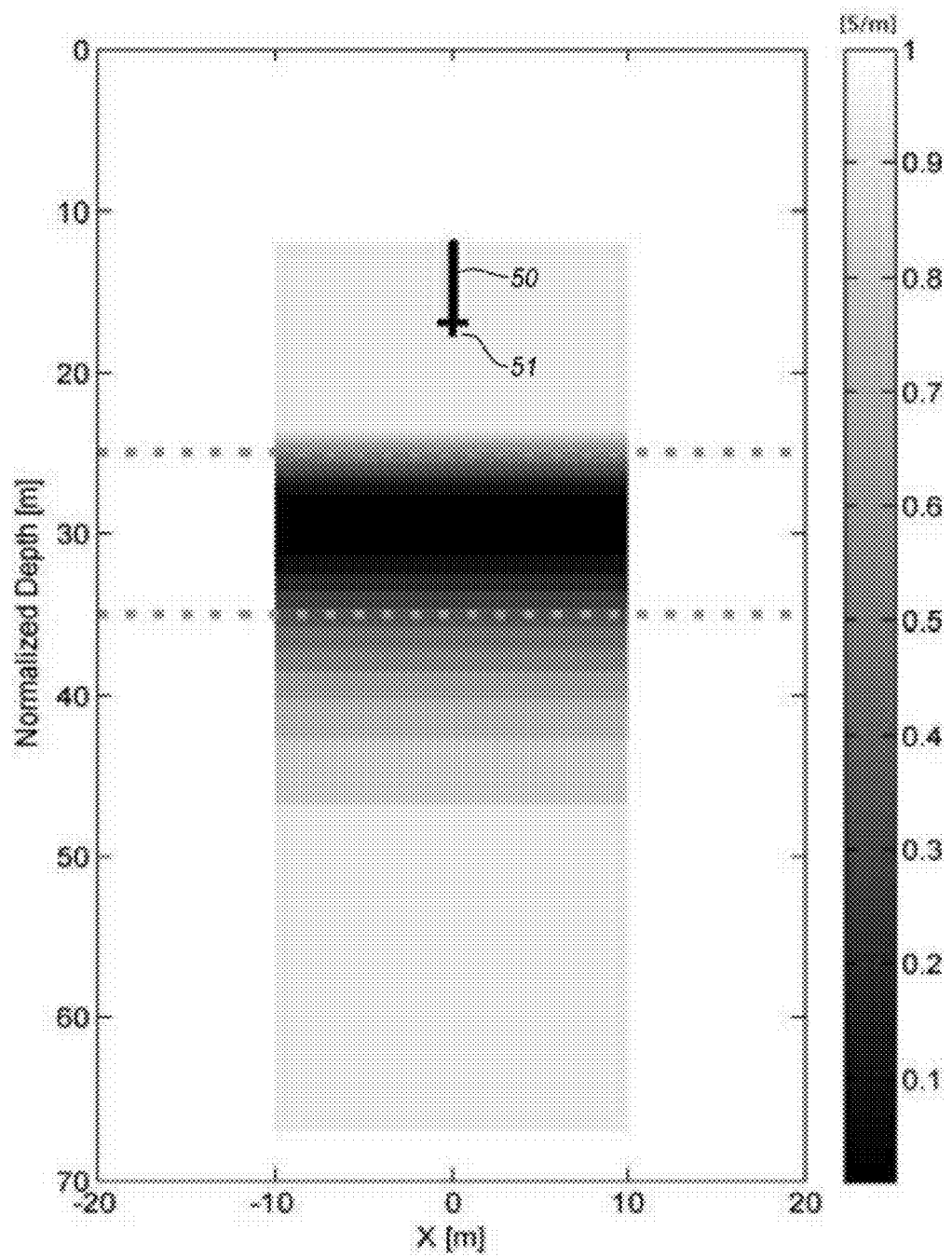

In the first case, the borehole is approaching the main reservoir layer vertically as shown by line 50 in FIG. 4. FIG. 4 also shows (shown by cross 51) the location of the tensor induction well-logging instrument. It may be observed in FIG. 4 the migration conductivity distribution ahead of the borehole for different distances of 14 m, 10 m, and 7 m from the induction logging device to the main reservoir, respectively (see panels a, b, and c in FIG. 4). One can see that the resistive target layer associated with the main reservoir 14 can be clearly detected by the time domain EM migration imaging ahead of the device.

Figure 5A:
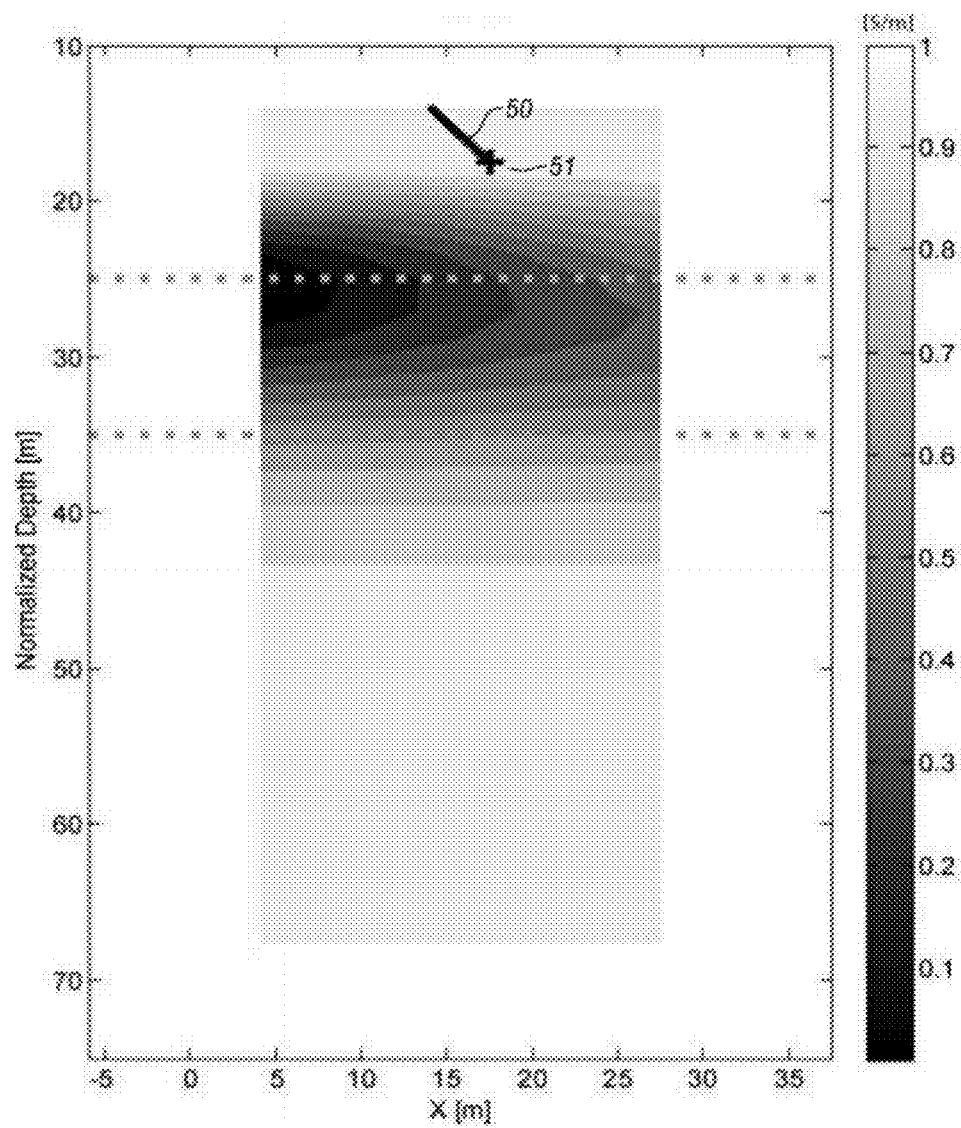
FIG. 5 illustrates a typical look-ahead migration image of a reservoir obtained from time-domain electromagnetic data recorded by a tensor induction well-logging device (shown by a cross) located in a well deviated at 45° with respect to the upper boundary of the approaching reservoir at different distances from the reservoir (panels a, b and c).
Figure 5B:
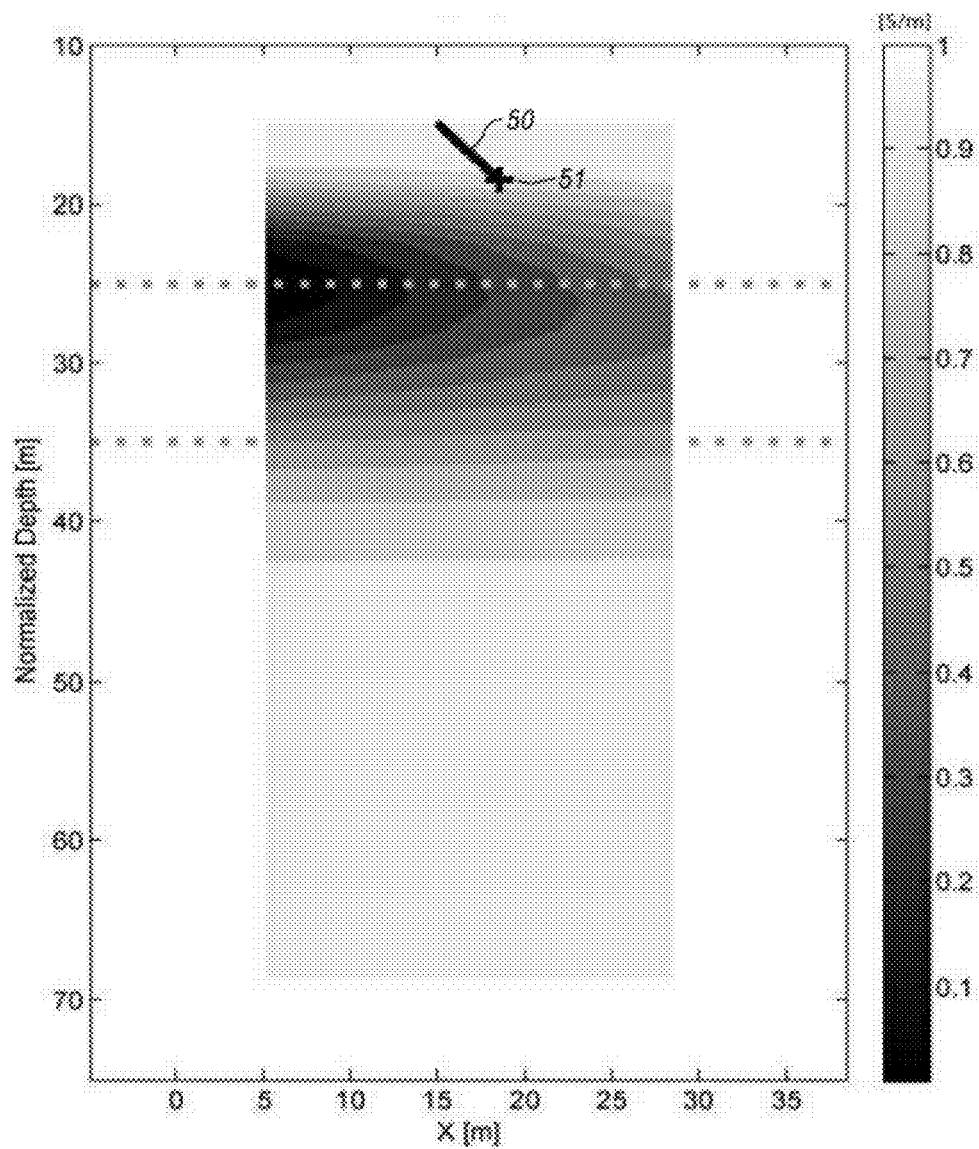
Figure 5C:
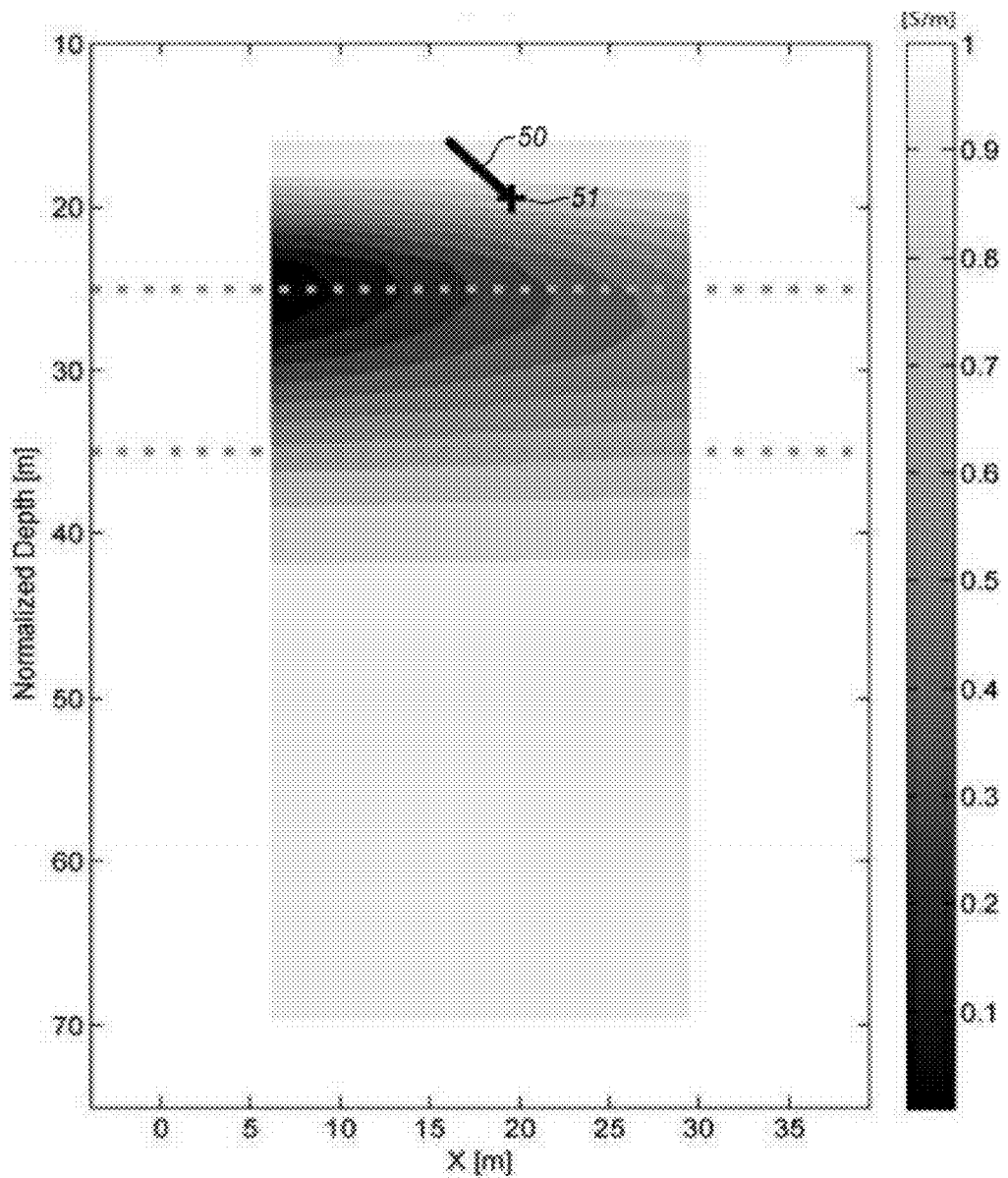

In the second case, a deviated borehole is approaching the main reservoir layer at a degree of 45° as shown by line 50 in FIG. 5. The different panels in FIG. 5 (a, b, and c) show the migration images for a device located at different distances from the main reservoir of 7 m, 6 m, and 5 m, respectively.

Figure 6A:
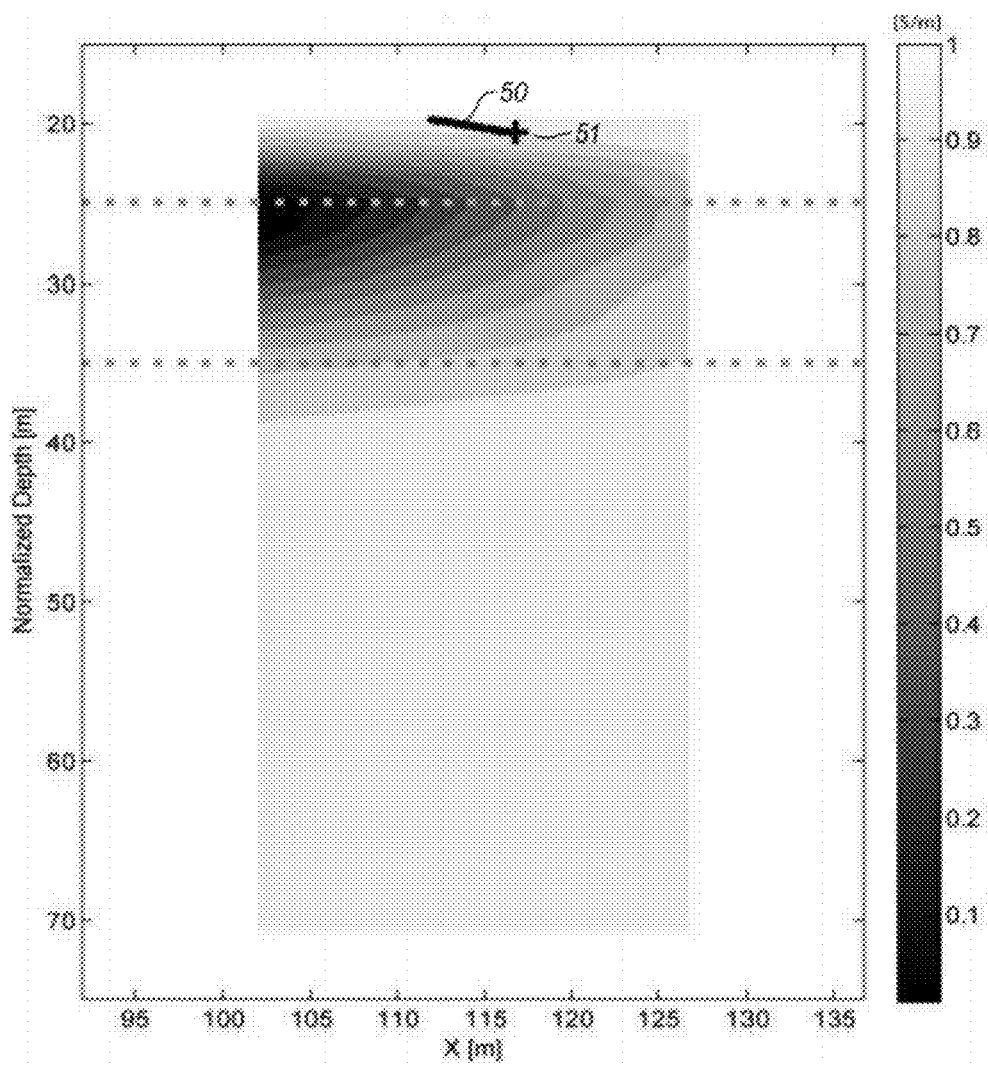
FIG. 6 illustrates a typical look-ahead migration image of a reservoir obtained from time-domain electromagnetic data recorded by a tensor induction well-logging device (shown by a cross) located in a well deviated at 10° with respect to the upper boundary of the approaching reservoir at different distances from the reservoir (panels a and b).
Figure 6B:
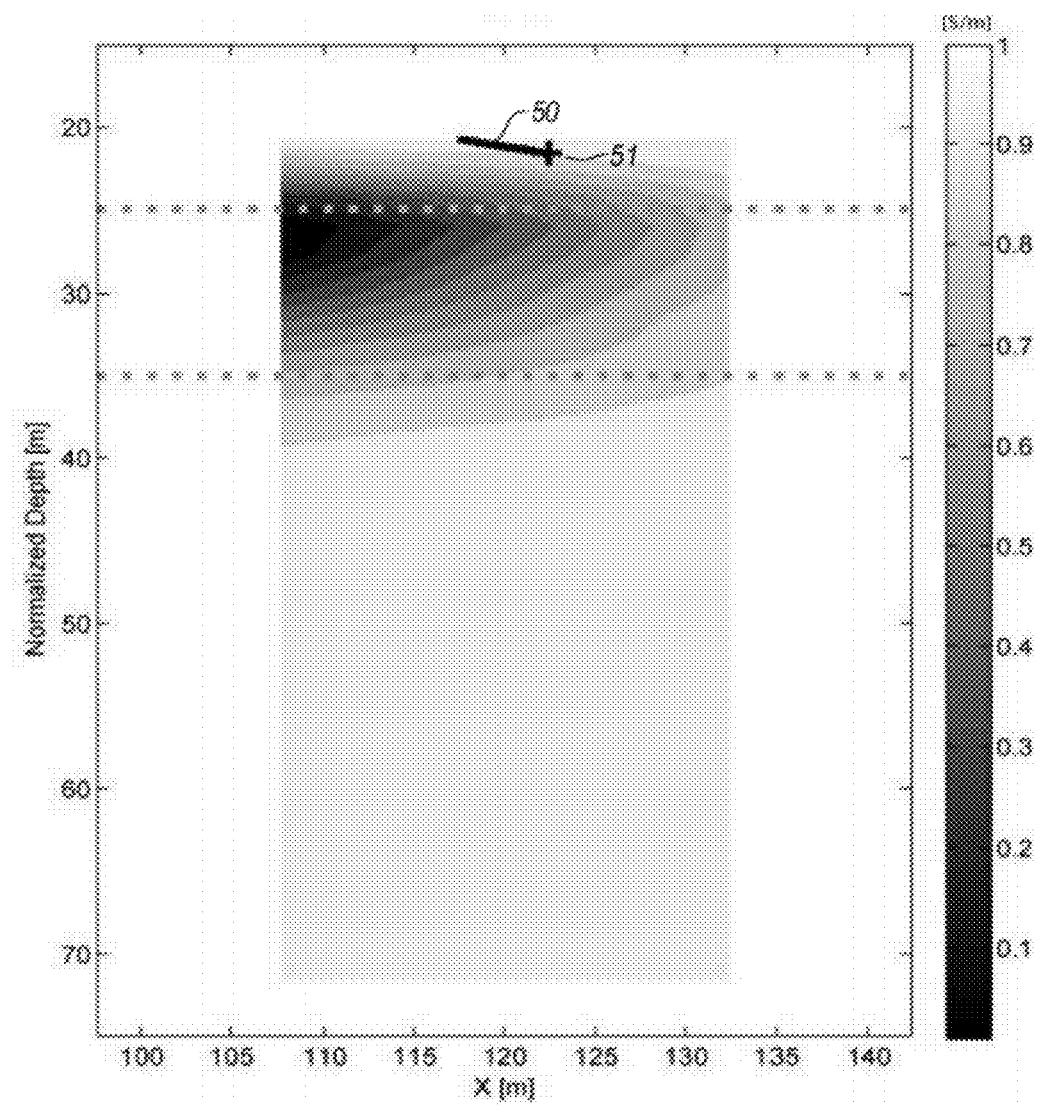

Finally, FIG. 6 corresponds to the case when the borehole is deviated at a degree of 10°. Panels a and b in FIG. 6 present the migration images for a device located at 4 m and 3 m from the approaching reservoir, respectively. It is obvious that the set of images shown in FIGS. 4 through 6 provide the necessary imaging-while-drilling capability in order to navigate the borehole inside the main reservoir.

An embodiment of a method 200 for imaging an object is schematically shown in FIG. 2 and will be explained with reference to the imaging system 1 shown in FIGS. 1A and 1B. In the illustrated embodiment, the method 200, and other methods and processes described herein, set forth various functional blocks or actions that may be described as processing steps, functional operations, events and/or acts, etc., which may be performed by hardware, software, and/or firmware.

The method 200 includes an act 201 of placing an electromagnetic logging device including one or more transmitters and one or more receivers in a borehole and generating frequency domain or time domain electromagnetic field. For example, the transmitters 1 and sensors 2 may be placed in the borehole and may be used to generate and measure the electromagnetic field.

The method 200 also includes an act 202 of replacing the at least one receiver with at least one conceptual source. For example, the processor 9 may conceptually replace the receiver 2 with the conceptual sources 25a-25c.

The method 200 further includes an act 203 of obtaining a migration electromagnetic field. For example, the processor 9 may calculate one or more migration electromagnetic fields 20a-20c. The migration electromagnetic fields 20a-20c may be equivalent to back-propagating (migration) fields produced by the conceptual sources 25.

The method 200 also includes an act 204 of calculating a reference electromagnetic field representative of a background medium. For instance, the processor 9 may calculate the reference electromagnetic field 21 of the background field.

The method 200 also includes an act 205 of obtaining an integrated sensitivity of the electromagnetic logging device including one or more transmitters and one or more receivers. For instance, the processor 9 may calculate an integrated sensitivity 35 of the electromagnetic logging device including one or more transmitters 1 and one or more receivers 2. In one embodiment, an estimate is made of a least square norm of values of perturbations of the measured data 10 at various locations in the geologic formation.

The method 200 further includes an act 206 of producing a migration image of the object in the examined medium. For example, the processor 9 may generate or produce a migration image 45a by generating a power spectra of the fields 20 and the field 21 or cross correlation of the fields 20 and the field 21 and spatially weighting the power spectra or cross correlation with the integrated sensitivity 35.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical non-transitory storage media. Computer-readable media that carry computer-executable instructions are transmission media. Thus, by way of example, and not limitation, embodiments of the invention can comprise at least two distinctly different kinds of computer-readable media: physical non-transitory storage media and transmission media.

Physical non-transitory storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of imaging-while-drilling and look-ahead imaging of a geological formation using borehole devices measuring multi-component vector and/or tensor induction logging data, said method comprising the steps of:
   a. operating one or more transmitters of a device representing an electromagnetic logging instrument formed by one or more induction and/or galvanic transmitters and one or more electric and/or magnetic field receivers to generate an electromagnetic field comprising a harmonic (frequency domain) and/or pulse (time domain) field, whereby said generated electromagnetic field propagates through geological formations penetrated by the borehole and ahead of the device in a wellbore;
   b. measuring at least one component of electric and/or magnetic field data with said one or more receivers;
   c. conceptually replacing the one or more receivers with an array of electric and/or magnetic dipole transmitters respectively, the electric and/or magnetic moment of each conceptual dipole transmitter replicating the actually measured electric and/or magnetic field in the corresponding one or more receivers;
   d. obtaining a migration electromagnetic field $\{E^m, H^m\}$ equivalent to that produced by the conceptual transmitters replacing the actual receivers and obtaining a reference field $\{E^r, H^r\}$ representative of a background medium consisting of said examined geological formation without the presence of an anomalous target;
   e. obtaining an integrated sensitivity of the electromagnetic logging device by estimating a least square norm of the values of perturbation of at least one component of measured electromagnetic electromagnetic logging instrument tensor data at said plurality of locations due to conductivity perturbation at a specific local area of the examined geologic formation;
   f. producing a migration image of said anomalous target by calculating a cross power spectra of said reference and said migration fields or cross correlation functions between said reference and said migration fields in the area around the borehole and/or ahead of the device and spatially weighting said cross power spectra or cross correlation functions with said integrated sensitivity;
   g. determining the location, shape and electrical conductivity and/or resistivity of said anomalous target within the geologic formation around a borehole and/or ahead of the device in a wellbore from the said migration image.

2. A method according to claim 1, wherein said one or more transmitters comprise a plurality of transmitters arranged in the borehole and wherein said one or more receivers comprise a plurality of receivers arranged in the borehole.

3. A method according to claim 2, wherein said one or more transmitters include both galvanic and/or induction transmitters.

4. A method according to claim 2, wherein said one or more receivers include both electric and/or magnetic field receivers.

5. A method according to claim 3 wherein said one or more transmitters comprise three mutually orthogonal induction magnetic field transmitters, and wherein said one or more receivers comprise three mutually orthogonal induction coil receivers.

6. A method according to claim 4 wherein said one or more transmitters comprise three mutually orthogonal induction magnetic field transmitters, and wherein said one or more receivers comprise three mutually orthogonal induction coil receivers.

7. A method according to claim 1 wherein said device measures at least one component of magnetic induction tensor data.

8. A method according to claim 1, wherein said electromagnetic field data measured by said step b is input to a computer, and said computer is operated to:
   analyze said electromagnetic field;
   compute the migration field by simulating replacing the one or more receivers with a conceptual array of electric and/or magnetic dipole transmitters respectively, the electric and/or magnetic moment of each conceptual dipole transmitter replicating the actually measured electric and/or magnetic field in the corresponding receivers;

compute the reference field $\{\{E^r, H^r\}$ as a field generated by the one or more transmitters in the background medium consisting of said examined geological formation without the presence of said anomalous target;

compute the integrated sensitivity of the electromagnetic field data acquisition system; and construct a volume image of anomalous electrical conductivity by calculating a cross power spectra of said reference and said migration fields or cross correlation functions between said reference and said migration fields in the area around the borehole and/or ahead of the device and spatially weighting of said cross power spectra or cross correlation functions with said integrated sensitivity.

9. A method according to claim 1, further comprising:
placing the device representing the electromagnetic logging instrument formed by one or more induction and/or galvanic transmitters and one or more electric and/or magnetic field receivers at one position or at various positions in the borehole prior to operating the device.

10. A physical non-transitory computer readable medium having stored thereon computer executable instructions that when executed by a processor cause a computing system to perform a method of imaging-while-drilling and look-ahead imaging of a geological formation using borehole devices measuring multi-component vector and tensor induction logging data, the method comprising:

conceptually replacing one or more electric and/or magnetic receivers of a electromagnetic logging device with one or more conceptual electric and/or magnetic dipole transmitters, wherein an electric and/or magnetic moment of each of the one or more conceptual dipole transmitters replicates an actually measured electric and/or magnetic component of a measured electromagnetic field measured by the corresponding one or more electric and/or magnetic receivers and received by the computing system, wherein the measured electromagnetic field is generated by one or more transmitters of the electromagnetic logging device placed in the borehole;

calculating a migration electromagnetic field generated by the conceptual transmitters;

calculating a reference electromagnetic field for the geological formation;

calculating an integrated sensitivity of the electromagnetic logging device to conductivity perturbations at various locations in the geological formation;

generating a migration image of a target within the geological formation based on the calculated migration electromagnetic field, reference electromagnetic field, and integrated sensitivity; and determining the location, shape and electrical conductivity of the target based on the migration image.

11. The physical non-transitory computer readable medium of claim 10, wherein the reference magnetic field is calculated as a field generated by the one or more transmitters of the electromagnetic logging device in a background medium consisting of the examined geological formation without the presence of an anomalous target.

12. The physical non-transitory computer readable medium of claim 10, wherein the method performs one of: directional imaging to identify fracture zones and hydrocarbon reservoir locations, provide look ahead images for early warning of approaching bed boundaries before a target zone is reached, or for adjusting borehole position (inclination and azimuth angles) during drilling operation to reach one or more specific geological targets.

13. A system for imaging-while-drilling and look-ahead imaging of a geological formation using borehole devices measuring multi-component vector and tensor induction logging data comprising:

a device representing an electromagnetic logging instrument formed by one or more induction and/or galvanic transmitters and one or more electric and/or magnetic field receivers; the one or more transmitters configured to generate a electromagnetic field and the one or more receivers configured to measure the generated electromagnetic field; and a computing system, the computing system comprising:
a processor; and
one or more physical non-transitory computer readable medium having computer executable instructions stored thereon that when executed by the processor, cause the computing system to perform the following:

conceptually replace one or more of the receivers with one or more conceptual electric and/or magnetic dipole transmitters, wherein an electric and/or magnetic moment of each of the one or more conceptual dipole transmitters replicates an actually measured electric and/or magnetic component of a measured electromagnetic field measured by the corresponding one or more receivers and received by the computing system, wherein the measured electromagnetic field is generated by the one or more transmitters;

calculate a migration electromagnetic field generated by the conceptual transmitters;

calculate a reference electromagnetic field for the geological formation;

calculate an integrated sensitivity of the electromagnetic logging device to conductivity perturbations at various locations in the geological formation;

generate a migration image of a target within the geological formation based on the calculated migration electromagnetic field, reference electromagnetic field, and integrated sensitivity; and determine the location, shape and electrical conductivity of the target based on the migration image.

14. The system of claim 13, wherein the device representing an electromagnetic logging instrument is placed in the borehole.

15. The system of claim 13, wherein the measured electromagnetic field comprises a harmonic (frequency domain) and/or pulse (time domain) field.

16. The system of claim 13, wherein the one or more induction and/or galvanic transmitters are an array of transmitters.

17. The system of claim 13, wherein the one or more electric and/or magnetic field receivers are an array of receivers.

18. The system of claim 13, wherein the one or more induction and/or galvanic transmitters comprise three mutually orthogonal induction magnetic field transmitters, and wherein the one or more electric and/or magnetic field receivers comprise three mutually orthogonal induction coil receivers.

19. The system of claim 13, wherein the device representing an electromagnetic logging instrument measures at least one component of magnetic induction tensor data.

20. The system of claim 13, wherein the system performs one of: directional imaging to identify fracture zones and hydrocarbon reservoir locations, provide look ahead images for early warning of approaching bed boundaries before a target zone is reached, or for adjusting borehole position (inclination and azimuth angles) during drilling operation to reach one or more specific geological targets.

\* \* \* \* \*

UNITED STATES PATENT AND TRADEMARK OFFICE
CERTIFICATE OF CORRECTION

PATENT NO.        : 8,624,969 B2                                            Page 1 of 2
APPLICATION NO.   : 13/183680
DATED             : January 7, 2014
INVENTOR(S)       : Zhdanov It is certified that error appears in the above-identified patent and that said Letters Patent is hereby corrected as shown below:

Title Page
Figure replace "Barehole" with "Borehole"

Title Page 2
Item (56), U.S. Patent Documents, change "6/2011 Velikhov et al." to --6/2008 Velikhov et al.--

Drawings
Sheet 1, Figure 1 "Barehole" is replaced with "Borehole"

In the Specification
Column 1
Line 25, change "Kriegshauser et al." to --Kriegshauser et al.).--
Line 29, change "An efficient" to --an efficient--

Column 4
Line 37, change "processor 9" to --central processing unit 9--
Line 40, change "processor 9" to --central processing unit 9--
Line 43, change "processor 9" to --central processing unit 9--
Line 47, change "receivers 3" to --receivers 2--
Line 52, change "processor 9" to --central processing unit 9--
Line 57, change "equivalent migration" to --equivalent to migration--
Line 58, change "processor 9" to --central processing unit 9--

Column 5
Line 5, change "processor 9" to --central processing unit 9--
Line 12, change "processor 9" to --central processing unit 9--
Line 16, change "processor 9" to --central processing unit 9--
Line 60, change "re-presented" to --represented--

Signed and Sealed this
Ninth Day of September, 2014

Michelle K. Lee
*Deputy Director of the United States Patent and Trademark Office*

Column 7
Line 50, change "sensors 2" to --receivers 2--
Line 55, change "processor 9" to --central processing unit 9--
Line 58, change "processor 9" to --central processing unit 9--
Line 65, change "processor 9" to --central processing unit 9--

Column 8
Line 4, change "processor 9" to --central processing unit 9--
Line 8, change "measured data 10" to --measured data 110--
Line 12, change "processor 9" to --central processing unit 9--

Column 9
Line 2, change "carry or" to --carry--

In the Claims
Column 10, Claim 1
Line 21, change "electromagnetic electromagnetic" to --electromagnetic--
Line 31, change "sensitivity;" to --sensitivity; and--

Column 11, Claim 8
Line 4, change "$\{\{E^r$" to --$\{E^r$--